United States Patent Office 3,349,088
Patented Oct. 24, 1967

3,349,088
THERAPEUTICALLY VALUABLE 1,2-DIHYRO-1,2,4-BENZOTRIAZINE DERIVATIVES AND PROCESS FOR PREPARATION THEREOF
Istvan Molnar, Theodor Wagner-Jauregg, Ulrich Jahn, and Georg Mixich, Zofingen, Switzerland, assignors to Siegfried Aktiengesellschaft, Zofingen, Switzerland, a corporation of Switzerland
No Drawing. Filed Oct. 21, 1964, Ser. No. 405,592
Claims priority, application Switzerland, Oct. 22, 1963, 12,928/63
8 Claims. (Cl. 260—248)

The present invention relates to therapeutically valuable compounds of the general formula

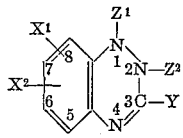

(I)

analgetic and antipyretic properties. The compounds disclosed herein are useful for alleviating the symptoms of rheumatic and allergic diseases and symptoms such as inflammation, edema, pain, fever, and swelling of the joints, and may be administered to human patients having such symptoms in a daily dosage of 50–1200 mg.

The compounds of Formula II can be reduced by catalytic hydrogenation or by means of metals having reducing properties (Sn, Zn, Fe, etc.) or with salts of them ($SnCl_2$, $FeCl_2$ etc.). Reduction and isolation of the desired product is preferably carried out in an inert atmosphere such as $N_2$ or $H_2$.

The following table shows a comparison between the compounds of this invention and the well-known antirheumatics phenylbutazone and sodium salicylate, in view of their inhibiting effect on the rat paw kaolin edema. On this model all the well-known antirheumatic remedies exhibit antiphlogistic properties, even on peroral administration; see Arzeimittel-Forschung 12, 1160 (1962).

| Compound No. | Substituents of Formula I | | | | Perorally given as salt of acid or base, resp. | $ED_{50}$ (dose for 50% inhibition of edema) | $DL_{50}$ (dose for 50% letality) | $DL_{50}/ED_{50}$ (therapeutic index) |
|---|---|---|---|---|---|---|---|---|
| | X | Y | $Z^1$ | $Z^2$ | | | | |
| Mo 533 | (7)Cl | $NH_2$ | H | H | HCl | 145 | 720 | 5 |
| Mo 780 | H | $N(CH_3)_2$ | H | H | HCl | 300 | ca. 1,250 | ca. 4 |
| Mo 817 | (7)Cl | $N(CH_3)_2$ | H | H | HCl | 90 | ca. 450 | ca. 5 |
| Mo 828 | (7)Cl | $NHC_2H_5$ | H | H | HCl | 115 | 910 | 8 |
| Mo 815 | (7)Cl | $OC_3H_7$ | $COCH(C_4H_9)CO$ | | $Na^+$ | ca. 220 | ca. 800 | ca. 4 |
| Mi 73A | (7)Cl | $N(CH_3)_2$ | $COCH(C_4H_9)CO$ | | $Na^+$ | ca. 70 | 440 | ca. 6.3 |
| Mo 855 | H | $N(CH_3)_2$ | $COCH(C_4H_9)CO$ | | $Na^+$ | ca. 225 | >3,500 | >15 |
| Mo 874 | (6)Cl | $N(CH_3)_2$ | $COCH(C_4H_9)CO$ | | $Na^+$ | 120 | 780 | 6.5 |
| Mo 888 | (6)Cl | $N(CH_3)_2$ | $COCH(C_3H_7)CO$ | | $Na^+$ | 90 | 610 | 6.8 |
| Mi 57 | (7)$CH_3$ | $N(CH_3)_2$ | $COCH(C_4H_9)CO$ | | $Na^+$ | 70 | 491 | 7 |
| Mi 85 | (7)$CH_3$ | $N(CH_3)_2$ | $COCH(C_3H_7)CO$ | | $Na^+$ | ca. 100 | 1,350 | ca. 13.5 |
| Phenylbutazone | | | | | $Na^+$ | 170 | 770 | 4 |
| Sodium salicylate | | | | | $Na^+$ | 600 | 1,600 | 2.7 | wherein $X^1$ and $X^2$ are identical or different members of the group consisting of hydrogen, halogen, lower alkyl, free and substituted amino groups, free, alkylated and acylated hydroxy groups; Y is a member of a group consisting of lower alkyl, aryl, free and substituted amino groups and free, alkylated and acylated hydroxy groups, and $Z^1$ and $Z^2$ are identical or different members of the group consisting of hydrogen and acyl radicals where both Z together may represent the diacyl biradical of a dibasic acid which may be substituted by lower alkyl, lower alkenyl, cycloalkyl, aryl and hydrocarbon radicals, eventually substituted by a member of the group including free and substituted amino radicals and free, alkylated and acylated hydroxy radicals.

The novel compounds of the invention are preferably prepared by treating a 1,2,4-benzotriazine-1-oxide of the general formula

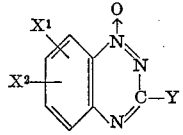

(II)

wherein X and Y have the above mentioned signification, with reducing agents and isolating the reduction product in the form of a crystalline salt with acids or as an acyl derivative. The 1,2-malonyl derivatives give salts with bases.

The above described compounds exert when perorally or parenterally administered either as such or in the form of their salts good antiphlogistic effects and have also The last column of this table shows that the therapeutic indices in the kaolin edema test for most of the compounds of this invention, are higher than those of phenylbutazone or sodium salicylate.

The following table shows that compounds of this invention on peroral administration have a higher antipyretic effect against the rat yeast fever and a stronger analgesic effect (phenylquinone test of Siegmund) than phenylbutazone or sodium salicylate.

| Compound | Phenylquinone test [1]—Analgesic effect $ED_{50}$ (mg. kg.) | | Yeast fever test [2]—Antipyretic effect of a peroral dose of 250 mg./kg. substance tested: average decrease of temperature during 6 hours in ° C. |
|---|---|---|---|
| | Oral | Subcutaneous | |
| Mo 533 | 42 | 9 | 2.8 |
| Mo 780 | ca. 100 | 75 | [3] 0.7 |
| Mo 799 | | | 4.0 |
| Mo 813 | 50 | 50 | |
| Phenylbutazone | 203 | 49 | 1.3 |
| Sodium salicylate | 580 | 475 | 2.0 |

[1] Intraperitoneal injection of a 0.025% phenylquinone solution containing 5% alcohol (0.1 ml. per 10 g. rat) 30 minutes after administration of the substance to examine. The typical pain-induced wreathing was observed on 5 animals during 20 minutes and compared with non treated animals.
[2] Intramuscular injection of a 15% yeast suspension (1 ml./100 mg. body weight).
[3] 100 mg./kg.

Example 1.—3-amino-7-chloro-(1,2-dihydro-1,2,4-benzotriazine) (Mo 533)

7 g. of the compound corresponding to Formula II (X=7-Cl, Y=$NH_2$) are dissolved in 200 ml. 5 N HCl in a flask filled with nitrogen and refluxed over 9 g. granulated tin. When the reddish color of the solution disappears, the heating is stopped and the solution is filtered in a flask containing $N_2$. After cooling the product crystallizes as a water-soluble hydrochloride in white needles. M.P. 231–233° C.

$C_7H_8N_4Cl_2$ (219.1): Calc. C, 38.38; H, 3.68; Cl, 32.38. Found C, 38.4; H, 3.9; Cl, 32.14.

*Example 2.—3-dimethylamino-(1,2-dihydro-1,2,4-benzotriazine) (Mo 780)*

7 g. of the compound corresponding to Formula II ($X=H$, $Y=N(CH_3)_2$) are, as described in Example 1, reduced with tin and hydrochloric acid. After cooling the reaction product crystallizes as a tin double salt. This salt is suspended in 50 parts of 1 N hydrochloric acid and treated at 80° C. with $H_2S$. Evaporation of the filtered solution yields hexagonal prisms of the monochlorhydrate. M.P. 205–207° C.

$C_9H_{13}N_4Cl \cdot \frac{1}{2}H_2O$ (221.7): Calc. C, 48.8; H, 6.33. Found C, 49.3; H, 6.3.

*Example 3.—3-propoxy-(1,2-dihydro-1,2,4-benzotriazine) (Mo 799)*

The starting material having the structure II ($X=H$, $Y=OC_3H_7$) can be obtained by heating 3-chloro-1,2,4-benzotriazine-1-oxide with the equivalent amount of sodium propylate in n-propanol (M.P. 90–92° C.). The hydrogenation is carried out with zinc powder and ammonia by heating a stirred mixture of 6.4 g. of the starting material with 6.4 g. of zinc powder in 260 ml. of alcohol and 130 ml. of concentrated ammonia on a water bath while introducing gaseous ammonia. As soon as the orange color of the solution disappears, the filtered alcoholic solution is evaporated under $N_2$. The residue is extracted with peroxyde-free ether, and 3 N alcoholic hydrochloric acid is added to the extract. The resulting hydrochloride has a melting point of 110–111° C.

$C_{10}H_{14}N_3OCl$ (227.7): Calc. C, 52.73; H, 6.2; Cl, 15.57. Found C, 52.83; H, 6.36; Cl, 15.57.

*Example 4.—1-acetyl-3-propoxy-(1,2-dihydro-1,2,4-benzotriazine) (Mo 806)*

2 g. of the starting material of Formula II ($X=H$, $Y=OC_3H_7$) are dissolved in a mixture of 20 ml. glacial acetic acid and 2 g. acetic anhydride. The reduction is carried out with hydrogen in the presence of 200 mg. Raney nickel. The filtered solution is heated to 90° C. and after dilution with 250 ml. of water the product melts at 144–145° C.

$C_{12}H_{15}N_3O_2$ (233.3): Calc. C, 61.77; H, 6.48; N, 18.0. Found C, 61.95; H, 6.64; N, 17.9.

*Example 5.—7-chloro-3-dimethylamino-(1,2-dihydro-1,2,4-benzotriazine) (Mo 817)*

The compound of Formula II ($X=7$-Cl, $Y=N(CH_3)_2$)

is used as sarting material. It can be obtained from 3,7-dichloro-1,2,4-benzotriazine-1-oxide and dimethylamine in an alcoholic solution by heating to 80° C. under pressure (M.P. 133° C.). The aforesaid starting material is treated in alcoholic solution with hydrogen in the presence of Raney nickel. The filtered solution containing the formed dihydro product is concentrated. After addition of concentrated alcoholic hydrochloric acid the product crystallizes in colorless needles of the hydrochloride. M.P. 215–220° C. (recrystallized from methanol).

$C_9H_{12}Cl_2N_4$ (247.1): Calc. C, 43.75; H, 4.89; Cl, 28.69. Found C, 43.60; H, 4.89; Cl, 28.79.

Addition of an excess of alcoholic hydrochloric acid and ether to the mother liquid yields a small amount of the dihydrochloride of 7-chloro-3-dimethylamino-1,2,3,4-tetrahydro-1,2,4-benzotriazine (M.P. 203–207° C.).

$C_9H_{15}Cl_3N_4$ (285.6): Calc. C, 37.85; H, 5.3; Cl, 37.25; N, 19.6. Found C, 38.22; H, 5.38; Cl, 37.20; N, 19.48.

*Example 6.—1,2-(n-butylmalonyl)-3-ethoxy-7-chloro-(1,2-dihydro-1,2,4-benzotriazine) (Mo 813)*

The starting material of the Formula II ($X=7$-Cl, $Y=OC_2H_5$), M.P. 104.5° C., which can be obtained in a theoretical yield by reacting 3,7-dichloro-1,2,4-benzotriazine-1-oxide with sodium ethylate, is treated in alcoholic solution with catalytically activated hydrogen to give the dihydro-compound. After having evaporated the solution in vacuo, the residue is dissolved with benzene and the solution is dried over anhydrous $CaSO_4$. To the dried solution are added 1 mol of butyl malonylchloride and 2 mols of triethylamine—both dissolved in abs. benzene. The rate of addition of the triethylamine should be somewhat greater than the rate of the acid chloride. After standing over night at room-temperature, precipitated triethylamine chlorhydrate is filtered off on a Büchner-funnel. The product is extracted from the benzene-solution with diluted NaOH. After addition of a small excess of HCl to the alcalic solution, the product is extracted by methylene chloride. After evaporation of the solvent, a light-brown colored viscous oil is obtained. Having dissolved this oil in a small amount of alcohol, the product crystallizes in form of white needles. M.P. 105° C.

$C_{16}H_{18}ClN_3O_3$ (335.8): Calc. C, 57.23; H, 5.4; Cl, 10.56; N, 12.51. Found C, 57.0; H, 5.54; Cl, 10.8; N, 12.49.

*Example 7.—1,2-(n-butylmalonyl)-7-chloro-3-propoxy-(1,2-dihydro-1,2,4-benzotriazine) (Mo 815)*

This product is obtained from 7-chloro-3-propoxy-1,2,4-benzotriazine-1-oxide (M.P. 131.5° C.) by the same method as described in Example 6. After crystallization from methanol the product melts at 107° C.

$C_{17}H_{20}ClN_3O_3$ (349.8): Calc. C, 58.35; H, 5.76; N, 12.01. Found C, 58.15; H, 5.76; N, 12.10.

*Example 8.—3-ethylamino-7-chloro-(1,2-dihydro-1,2,4-benzotriazine) (Mo 828)*

22.4 g. of 3-ethylamino-7-chloro-1,2,4-benzotriazine-1-oxide (Formula II, $X=7$, $Y=NH.C_2H_5$, M.P. 194–195° C., obtained by heating 3,7-dichloro-1,2,4-benzotriazine-1-oxide with alcoholic ethylamine) are suspended in 80 cm.³ glacial acetic acid and hydrogenated in the presence of a catalyst (Raney nickel). When 2 mols of hydrogen per 1 mol benzotriazine-1-oxide are absorbed, the glacial acetic acid is evaporated in vacuo and the residue is dissolved in 80 cm.³ ethanol. Addition of the equivalent amount alcoholic hydrochloric acid and 80 cm.³ ether causes the product to crystallize as a hydrochloride, which forms slightly colored needles. M.P. 193–195° C.

$C_9H_{12}N_4Cl_2$ (247.1): Calc. C, 45.98; H, 5.40; N, 21.49. Found C, 46.02; H, 5.61; N, 21.49.

The free base can be liberated from the so obtained hydrochloride by treating its aqueous solution with sodium bicarbonate followed by extraction with methylene chloride.

By analogous methods there have been synthetized the following derivatives of the 7-chloro-1,2-dihydro-1,2,4-benzotriazine substituted in the 3-position as hydrochlorides:

| | M.P. (° C.) |
|---|---|
| Mo 823 the 3-piperidino derivative | 203–207 |
| Mo 829 the 3-propylamino derivative | 171–173 |
| the 3-isobutylamino derivative | 177–179 |
| Mo 849 the 3-(3'-morpholino)-propyl derivative | 223–225 |
| Mo 819 the 3-diethylamino derivative | 205–209 |
| Mo 821 the 3-benzylamino derivative | 180 |
| Mo 822 the 3-methylamino derivative | 190–192 |

*Example 9.—1-acetyl-3-dimethylamino-7-chloro-(1,2-dihydro-1,2,4-benzotriazine) (Mo 837)*

3 - dimethylamino-7-chloro-1,2,4-benzotriazine-1-oxide (Formula II: X=7-Cl, Y=N(CH₃)₂), which has been used as starting material also in Example 5, is hydrogenated in the presence of Raney nickel in 25 volume parts of ethanol containing 20% of acetic acid. After reduction the solvent is evaporated in vacuo, and the residue is dissolved in 10 vol. parts of glacial acetic acid. After addition of an equimolar amount of acetic acid anhydride and a few drops of conc. H₂SO₄ the solution is refluxed for half an hour. After cooling, the reaction mixture is poured onto a mixture of crushed ice and an excess of conc. NaOH solution; the precipitated product is filtered on a Büchner-funnel. Recrystallized from methanol, the product forms lightly colored needles with a M.P. of 181–183° C.

$C_{11}H_{13}ClN_4O$ (252.7): Calc. C, 52.29; H, 5.18; N, 22.17. Found C, 52.64; H, 5.15; N, 22.32.

Reaction of the same starting material as above with 2 moles of acetic acid anhydride gives the diacetyl derivative (M.P. 152° C.), with formic acid and 1 mole of acetic acid anhydride the 1-formyl-derivative (M.P. 179–183° C.).

Treatment of the 1-acetyl derivative with benzoyl chloride and triethylamine yields the 1-acetyl-2-benzoyl derivative (M.P. 170–171° C.), replacement of benzoyl chloride by p-chlorobenzoyl chloride affords the corresponding 1-acetyl-2-p-chlorobenzoyl derivative (M.P. 183–184° C.). By analogous hydrogenation of 3 - dimethylamino - 7-methyl-1,2,4-benzotriazine-1-oxide followed by reaction with ethyl-chlorcarbonate the 1,2-di(carbethoxy)-3-dimethylamino - 7 - methyl - (1,2-dihydro-1,2,4-benzotriazine) is obtained (M.P. 105° C.).

*Example 10.—1,2-butylmalonyl-3-dimethylamino-(1,2-dihydro-1,2,4-benzotriazine) (Mo 855)*

(a) In a 3-neck-flask with descending condenser to 3.8 g. of 3-dimethylamino-(1,2-dihydro-1,2,4-benzotriazine) are added 0.52 g. metallic sodium, dissolved in a small volume of abs. alcohol, 4.5 g. of diethylbutylmalonate and 15 ml. of xylene, in a nitrogen atmosphere. The mixture is heated during 2 hours to 70° C., then during 3 hours to 110–130° C. and during one more hour to 150° C., slowly distilling off the alcohol and most of the xylene. To the resulting lightly brown colored mass are added 200 ml. of water. The resulting solution is extracted twice with ether or benzene and afterwards acidified with HCl. Yield 3.6 g. of 1,2-butylmalonyl-3-dimethylamino-(1,2-dihydro-1,2,4-benzotriazine). After crystallisation from alcohol the melting point is 189–190° C.

(b) 3 - dimethylamino-1,2,4-benzotriazine-oxide (Formula II: X=H, Y=N(CH₃)₂) is shaken in the presence of Raney nickel in 15 vol. parts of an alcohol-acetic acid (9:1) mixture in a hydrogen-atmosphere. The mixture absorbs 2 moles hydrogen per 1 mol starting material. Hydrogenation can also be effected using a palladium catalyst with a suitable solvent. After reduction it is filtered on a Büchner-funnel through a Hyflow-layer and the solvent is evaporated in vacuo under nitrogen. The residue is dissolved in 20 parts of water-free dioxane and treated at 60° C. with the calculated amount of butylmalonyl chloride (1 mol/mol) and triethylamine (2 mol/mol). The separated triethylamine hydrochloride is filtered, the dioxane-solution is evaporated under vacuo to dryness, and the residue is dissolved in 7 vol. parts of boiling acetic acid. After cooling, the product separates in lightly yellowish crystals. They are dissolved in the calculated amount of 0.25 N NaOH, treated with a small amount of carbon and precipitated with HCl. Melting point of the purified product is 187° C. Yield: approximately 60% of the theoretical amount.

$C_{16}H_{20}N_4O_2$ (300.4): Calc. C, 63.97; H, 6.71; N, 18.67. Found C, 64.08; H, 7.87; N, 18.79.

By analogous methods the following derivatives of the 1,2 - butylmalonyl - 3-dimethylamino-(1,2-dihydro-1,2,4-benzotriazine) can be prepared:

|  | M.P. (° C.) |
|---|---|
| Mo 838 the 7-chloro derivative | 202–203 |
| Mo 874 the 6-chloro-derivative | 203–205 |
| Mi 57 the 7-methyl derivative | 212–213 |
| Mi 43 the 7-methoxy derivative | 207 |
| Mi 63 the 6,7-dimethyl derivative | 216 |
| Mi 42 the 6-methoxy-7-chloro derivative | 206 |
| Mi 73A the 6-dimethylamino-7-chloro derivative | 117–118 |

In an analogous manner the following 1,2-alkylmalonyl-3-dimethylamino-(1,2-dihydro-1,2,4-benzotriazine) derivatives are obtained:

|  | M.P. (° C.) |
|---|---|
| Mo 884 the 1,2-(propylmalonyl) derivative | 207 |
| Mo 886 the 1,2-(pentylmalonyl) derivative | 188 |
| Mo 887 the 1,2-(pentylmalonyl)-6-chloro derivative | 200 |
| Mo 888 the 1,2-(propylmalonyl)-6-chloro derivative | 195 |
| Mo 890 the 1,2-(cyclopentylmalonyl)-6-chloro derivative | 191 |
| Mi 85 the 1,2-(propylmalonyl)-7-methyl derivative | 228 |
| Mi 88 the 1,2-(pentylmalonyl)-7-methyl derivative | 215 |

*Example 12.—1,2-butylmalonyl-3-phenyl-(1,2-dihydro-1,2,4-benzotriazine) (Mo 889B)*

10 g. of 3-phenyl-1,2,4-benzotriazine (prepared according to R. Fusco et al., 1st Lomb. r. sc., vol. 91, p. 936 (1957) C.A. 53, 9243) are dissolved in a mixture of ethanol and acetic acid and treated with hydrogen in the presence of Raney nickel. After hydrogenation the solvent is evaporated and the residue is dissolved in dioxane and in analogy to Example 10a treated with an equivalent amount of butylmalonyl-dichloride. After evaporation of the solvent, the reaction product is dissolved in dilute sodium hydroxyde and precipitated with HCl. After recrystallisation from acetone colorless crystals are obtained with a melting point of 165–166° C.

We claim:

1. A chemical compound having the formula

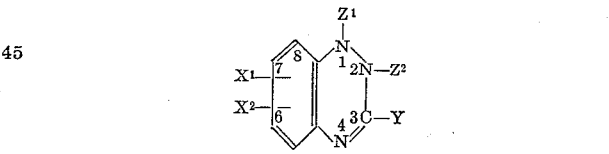

wherein X¹ and X² are independently selected from the group consisting of hydrogen, halogen, lower alkyl, lower alkoxy and lower alkylamino;

Y is a member selected from the group consisting of amino, lower alkylamino, lower alkoxy, phenyl, piperidino, morpholino lower alkyl and phenyl lower alkyl;

Z¹ and Z², when independent groups, are independently selected from the class consisting of hydrogen, acyl radicals of lower aliphatic carboxyl acids, and acyl radicals of araliphatic carboxylic acids;

Z¹ and Z², when linked together, represent the diacyl di-radical of an acid selected from the group consisting of lower aliphatic dibasic carboxylic acids and lower aliphatic dibasic carboxylic acid whose alkylene group is substituted with cycloalkyl;

and when Y is amino, at least one of X¹, X², Z¹, and Z² is not hydrogen.

2. A chemical compound according to claim 1, wherein at least one of Z¹ and Z² is not hydrogen.

3. The 3-ethylamino-7-chloro-1,2-dihydro-1,2,4-benzotriazine.

4. The 1,2 - propylmalonyl-3-dimethylamino-6-chloro-1,2-dihydro-1,2,4-benzotriazine.

5. The 1,2-propylmalonyl-3-dimethylamino-7-methyl-1,2-dihydro-1,2,4-benzotriazine.

6. The method of producing a compound having the formula

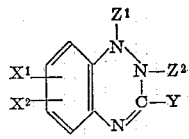

wherein $X^1$ and $X^2$ are independently selected from the group consisting of hydrogen, halogen, lower alkyl, lower alkoxy and lower alkylamino;
Y is a member selected from the group consisting of amino, lower alkylamino, lower alkoxy, phenyl, piperidino, morpholino lower alkyl and phenyl lower alkyl;
$Z^1$ and $Z^2$, when independent groups, are independently selected from the class consisting of hydrogen, acyl radicals of lower aliphatic carboxylic acids, and acyl radicals of araliphatic carboxylic acids;
$Z^1$ and $Z^2$, when linked together, represent the diacyl di-radical of an acid selected from the group consisting of lower aliphatic dibasic carboxylic acids and lower aliphatic dibasic carboxylic acids whose alkylene group is substituted with cycloalkyl;
which comprises treating a 1,2,4-benzotriazine-1-oxide having the structure

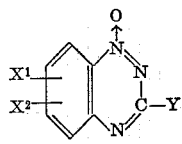

wherein $X^1$, $X^2$ and Y have the meaning given above, with a hydrogenating agent and isolating the thus obtained product as a salt or an acyl derivative.

7. The method according to claim 6 which comprises acylating the hydrogenated product by introducing into 1,2-position the diacyl biradical of a dicarboxylic acid.

8. The method according to claim 6 which comprises acylating the hydrogenated product by introducing into 1,2-position the diacyl biradical of a dicarboxylic acid having the formula

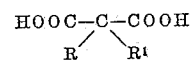

wherein R and $R^1$ are independently selected from the class consisting of hydrogen, lower alkyl and cycloalkyl.

References Cited

UNITED STATES PATENTS 2,489,353  11/1949  Wolf _____ 260—248

OTHER REFERENCES

Arndt, Chemische Berichte, vol. 46, pp. 3522–3530 (1913), abstracted C.A., vol. 8, p. 685 (1914).

Fusco et al., Gazz. Chim. Ital., vol. 90, pp. 1113–1124 (1960), abstracted C.A., vol. 55, cols. 22333–4 (1961).

WALTER A. MODANCE, *Primary Examiner.*

N. S. MILESTONE, *Examiner.*

J. M. FORD, *Assistant Examiner.*